(12) United States Patent　　(10) Patent No.:　US 12,646,946 B2

Fan et al.　　(45) Date of Patent:　Jun. 2, 2026

---

(54) DETERMINING GRID IMPEDANCE FOR POWER PLANTS

(71) Applicant: University of South Florida, Tampa, FL (US)

(72) Inventors: Lingling Fan, Tampa, FL (US); Zhixin Miao, Tampa, FL (US)

(73) Assignee: University of South Florida, Tampa, FL (US)

( * ) Notice: Subject to any disclaimer, the term of this patent is extended or adjusted under 35 U.S.C. 154(b) by 379 days.

(21) Appl. No.: 18/498,137

(22) Filed: Oct. 31, 2023

(65)　　　Prior Publication Data

US 2024/0348057 A1　　Oct. 17, 2024

Related U.S. Application Data

(60) Provisional application No. 63/495,903, filed on Apr. 13, 2023.

(51) Int. Cl.
|  |  |
|---|---|
| *H02J 3/38* | (2026.01) |
| *H02J 13/10* | (2026.01) |
| *H02J 101/24* | (2026.01) |
| *H02J 101/28* | (2026.01) |

(52) U.S. Cl.
CPC .............. *H02J 3/381* (2013.01); *H02J 13/10* (2026.01); *H02J 2101/24* (2026.01); *H02J 2101/28* (2026.01)

(58) Field of Classification Search
CPC .................................. H02J 3/381; H02J 13/10
USPC ........................................................ 700/295
See application file for complete search history.

(56)　　　References Cited

U.S. PATENT DOCUMENTS

| | | | |
|---|---|---|---|
| 7,710,729 B2 | 5/2010 | Li et al. | |
| 2014/0152292 A1* | 6/2014 | Andresen | ................ H02S 50/00 |
| | | | 324/707 |
| 2020/0293703 A1* | 9/2020 | Gu | .......................... G06F 30/20 |
| 2020/0403542 A1* | 12/2020 | Kim | ........................... H02P 9/14 |
| 2022/0077688 A1* | 3/2022 | Patarroyo | ................. H02J 3/46 |

(Continued)

OTHER PUBLICATIONS

Raghami, Alireza. A novel Thevenin-based voltage droop control improving reactive power sharing with structures to identify Thevenin parameters. Diss. Queensland University of Technology, 2019. (pp. 16-18, TOC and excerpted references table included.) (Year: 2019).*

(Continued)

*Primary Examiner* — Mohammad Ali
*Assistant Examiner* — Joshua T Sanders
(74) *Attorney, Agent, or Firm* — Meunier Carlin & Curfman LLC

(57)　　　ABSTRACT

In some aspects, the techniques described herein relate to a method including: receiving a data stream from one or more power plants at the same location by a computing device; based on the received data stream, determining a grid impedance of the one or more power plants with respect to a grid by the computing device; based on the received data stream, determining power plant control parameters and communication delay for each of the one or more power plants; and modeling the integrated system consisting of the one or more power plants and the grid based on the determined grid impedance and the power plant control parameters by the computing device.

20 Claims, 7 Drawing Sheets

(56) References Cited

U.S. PATENT DOCUMENTS

| | | | | |
|---|---|---|---|---|
| 2022/0149628 A1* | 5/2022 | Kirschen | .............. | G05B 13/041 |
| 2024/0003987 A1* | 1/2024 | Giuntoli | ................ | G01R 31/58 |

OTHER PUBLICATIONS

Du, Y. and Liao, Y., 2012. On-line estimation of transmission line parameters, temperature and sag using PMU measurements. Electric Power Systems Research, 93, pp. 39-45.

Sun, Jinping, Qifang Chen, and Mingchao Xia. "Data-driven detection and identification of line parameters with PMU and unsynchronized SCADA measurements in distribution grids." CSEE Journal of Power and Energy Systems 10.1 (2022): 261-271.

Y. Cheng et al., "Real-world subsynchronous oscillation events in power grids with high penetrations of inverter-based resources," IEEE Trans. Power Syst., early access, Mar. 23, 2022, doi: 10.1109/TPWRS. 2022.3161418.

S.-H. Huang, J. Schmall, J. Conto, J. Adams, Y. Zhang, and C. Carter, "Voltage control challenges on weak grids with high penetration of wind generation: Ercot experience," in Proc. Power Energy Soc. Gen. Meeting, 2012, pp. 1-7.

L. Fan and Z. Miao, "An explanation of oscillations due to wind power plants weak grid interconnection," IEEE Trans. Sustain. Energy, vol. 9, No. 1, pp. 488-490, Jan. 2018.

Y. Li, L. Fan, and Z. Miao, "Stability control for wind in weak grids," IEEE Trans. Sustain. Energy, vol. 10, No. 4, pp. 2094-2103, Oct. 2019.

L. Fan, "Modeling type-4 wind in weak grids," IEEE Trans. Sustain. Energy, vol. 10, No. 2, pp. 853-864, Apr. 2019.

D. Ramasubramanian, "Differentiating between plant level and inverter level voltage control to bring about operation of 100% inverter based resource grids," Electric Power Syst. Res., vol. 205, 2022, Art. No. 107739.

* cited by examiner

Figure 7:
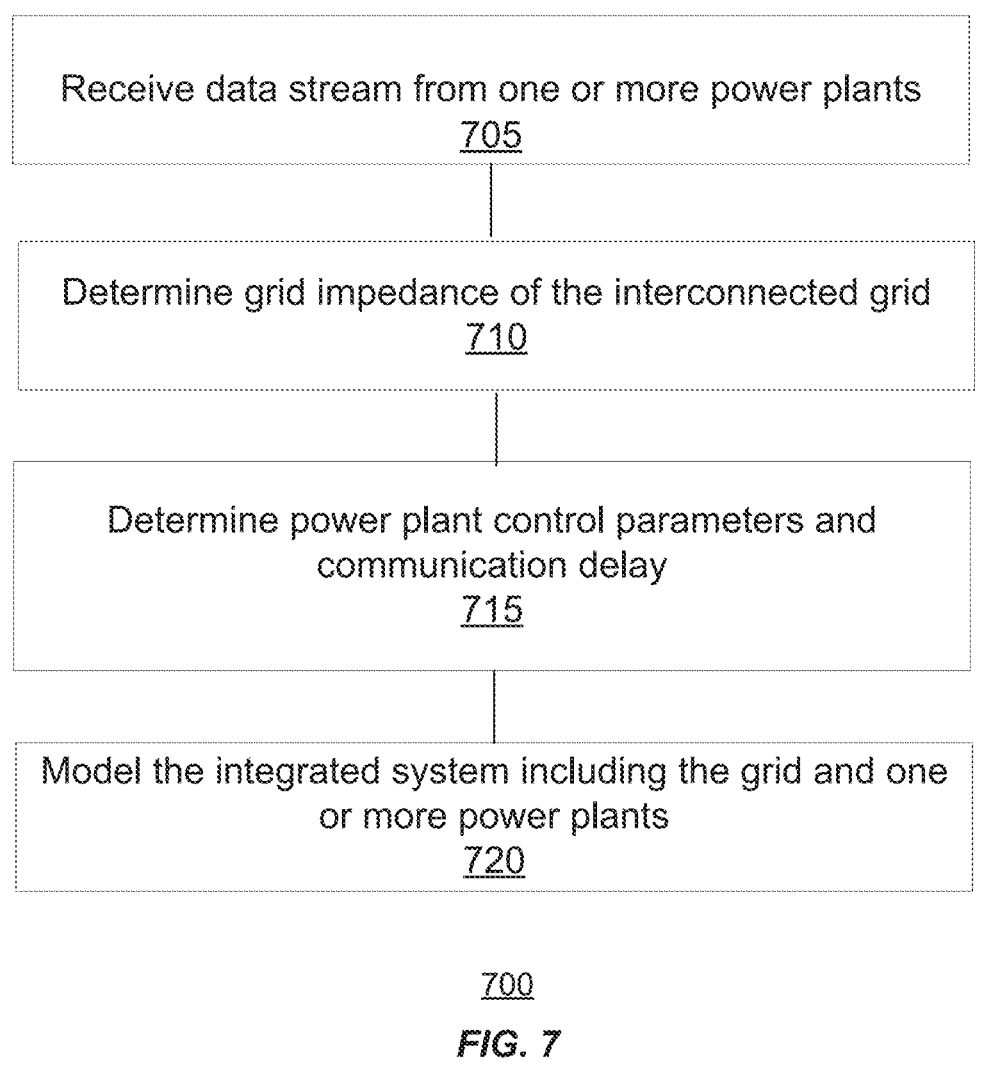

Receive data stream from one or more power plants
705

Determine grid impedance of the interconnected grid
710

Determine power plant control parameters and
communication delay
715

Model the integrated system including the grid and one
or more power plants
720

DETERMINING GRID IMPEDANCE FOR POWER PLANTS

CROSS-REFERENCE TO RELATED APPLICATIONS

This application claims priority to U.S. Provisional Patent Application No. 63/495,903 filed on Apr. 13, 2023, and entitled "Using SCADA/PMU data to identify grid impedance." The disclosure of which is hereby incorporated by reference in its entirety.

STATEMENT OF GOVERNMENT SUPPORT

This invention was made with government support under 0008771 awarded by the Department of Energy (DOE). The government has certain rights in the invention.

BACKGROUND

It is well known that the communication delay between the plant control and the inverter-level control may cause oscillations, especially when the grid strength is weak. A 4-Hz oscillation event in Texas's type-4 wind farm is such an example. When one of the parallel 69-kV transmission lines connecting the wind farm to the grid was tripped, the wind farm's point of interconnection (POI) bus experienced a reduction in short circuit ratio (SCR) from 4 to 2. The wind farm then experienced poorly damped oscillations. Reducing the plant-level voltage control gain can mitigate the oscillations. A simple feedback system consisting of the plant-level voltage integral control, communication delay, and the effect of var on voltage has been built in prior research and this system can successfully explain the formation of low-frequency oscillations due to communication delay and why reducing the voltage control gain can help stability.

On the other hand, the simplified model has not included the real power effect on voltage. Hence, this model cannot be used to explain why ramping up power can cause oscillations to appear. Furthermore, it cannot explain why oscillations appear only in voltage and var, but not in real power.

It is with respect to these and other considerations that the various aspects and embodiments of the present disclosure are presented.

SUMMARY

In some aspects, the techniques described herein relate to a method including: receiving a data stream from one or more power plants at the same location by a computing device; based on the received data stream, determining a grid impedance of the one or more power plants with respect to a grid by the computing device; based on the received data stream, determining power plant control parameters and communication delay for each of the one or more power plants; and modeling the integrated system consisting of the one or more power plants and the grid based on the determined grid impedance and the power plant control parameters by the computing device.

In some aspects, the techniques described herein relate to a method, wherein the data stream includes a SCADA/PMU data stream.

In some aspects, the techniques described herein relate to a method, wherein each power plant includes one more solar photovoltaic panels or wind turbines.

In some aspects, the techniques described herein relate to a method, wherein the grid impedance is the Thévenin equivalent impedance.

In some aspects, the techniques described herein relate to a method, wherein determining the grid impedance includes determining the grid impedance based on a trend of real power, reactive power and voltage from the data stream.

In some aspects, the techniques described herein relate to a method, determining the grid impedance includes determining the impedance based on dynamics from the data stream.

In some aspects, the techniques described herein relate to a method, wherein modeling the grid-integrated power plants based on the determined impedance further includes: for each power plant of the plurality of power plants, estimating the voltage control droop gain and communication delay for the power plant; modeling the grid based on the determined impedance; and modeling the one or more power plants based on the estimated droop gains and communication delays.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIG. 7 is an illustration of an example method 700 for modeling one or more power plants 110 and a grid 150.

DETAILED DESCRIPTION

The description is not to be taken in a limiting sense, but is made merely for the purpose of illustrating the general principles of the invention, since the scope of the invention is best defined by the appended claims.

Various inventive features are described herein that can each be used independently of one another or in combination with other features.

Figure 1:
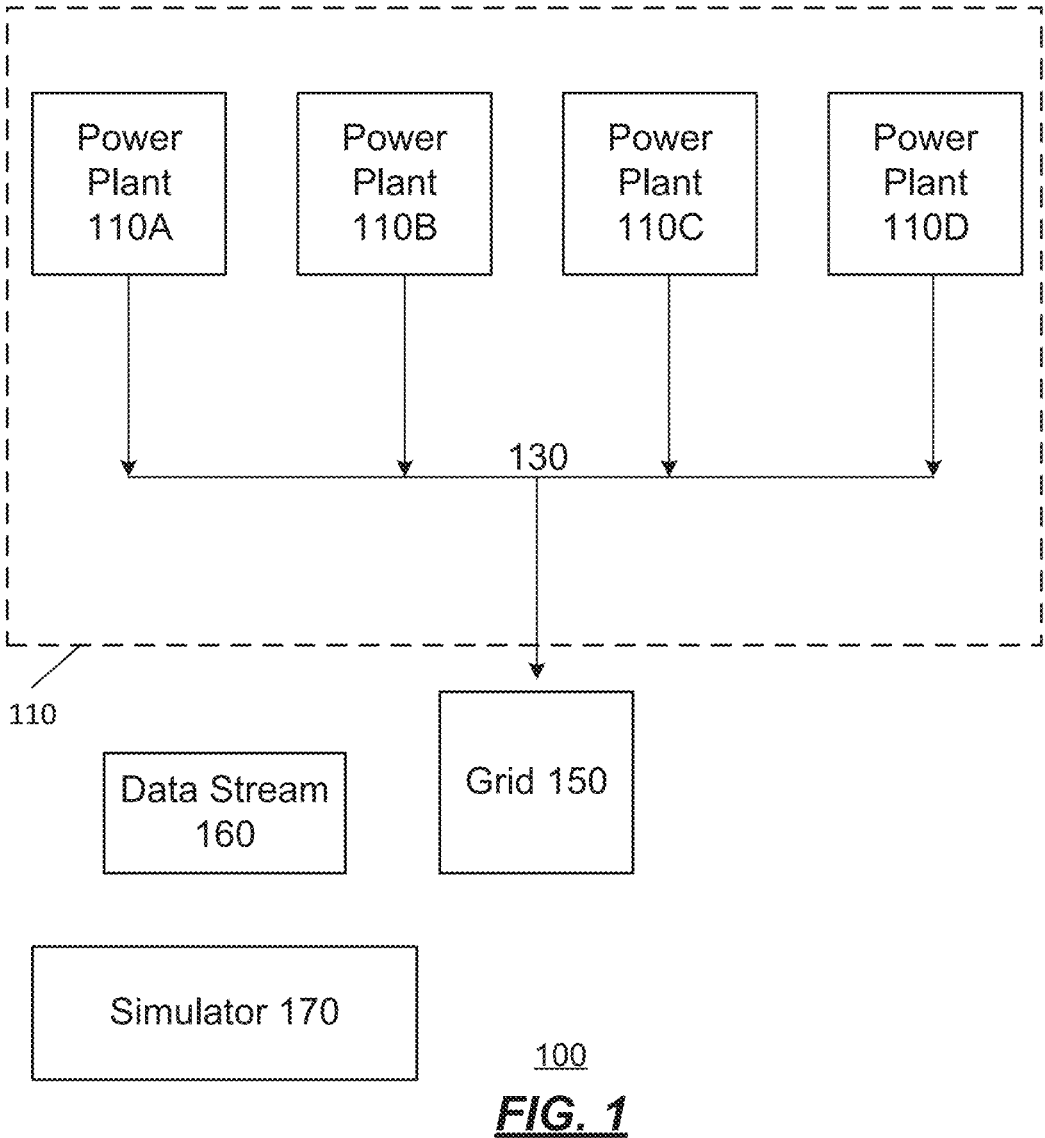
FIG. 1 is an illustration of exemplary system 100.

FIG. 1 is an illustration of exemplary system 100. As shown, the system includes a plurality of power supplies 110 (i.e., the power plants 110A, 110B, 110C, and 110D) connected to a bus 130 and a grid 150. Each power plant may be made of a variety of inverter-based power sources including, but not limited to, photovoltaic cells and wind turbines. Note that while four power plants are shown, it is for illustrative purposes only. There is no limit to the number of power plants 110 that may be connected to the grid 150.

Some or all of the power plants 110 may generate a data stream 160. The data stream 160 may be a supervisory control and data acquisition (SCADA) or phasor measurement units (PMU) data stream and may including information about each power plant 110 at various times. The information may include a current or voltage output at a particular time. Other information may be included.

The data stream 160 may be received by a simulator 170 via the 130 or other means. As will described further herein, the simulator 170 may receive the data stream 160 from the power plants and may use the received data to model the power plants 110 and grid 150. The model may be used by the simulator 170 to simulate the power plants 110 and grid 150. Simulating the power plants 110 and grid 150 may be useful for a variety of purposes such as performing quantitative analysis on oscillation events, predicting stability, and testing mitigation strategies.

Figure 2:
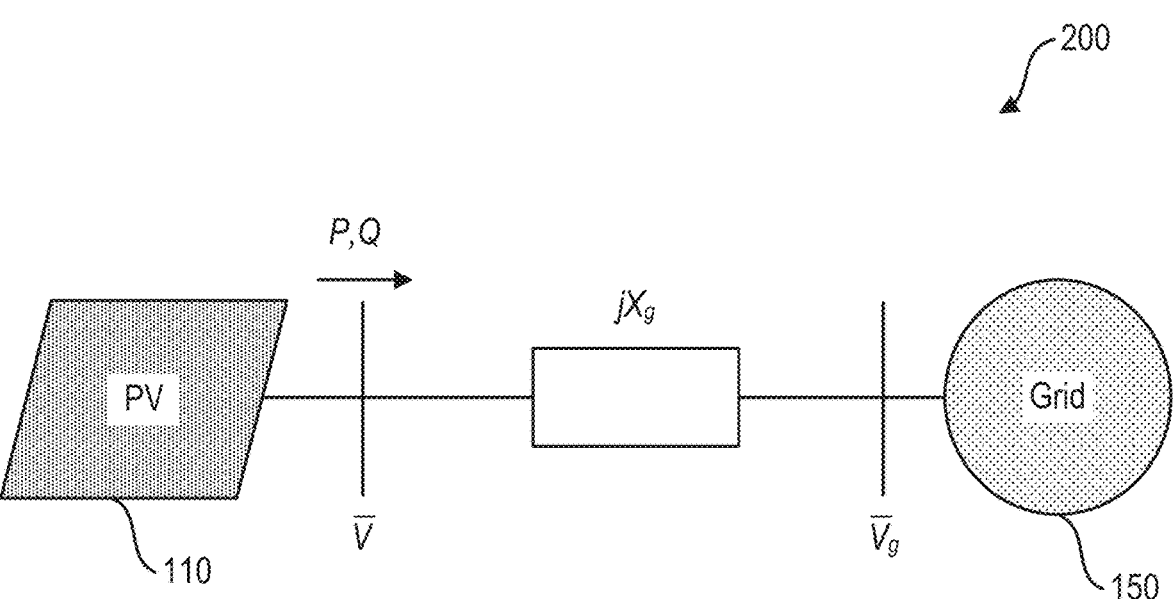
FIG. 2 is an illustration of exemplary system 200.

The power plants 110 can be thought of a single inverter-based resource 110 interconnected to an infinite bus with a grid impedance of $jX_g$. As an example, the four power plants 110A-D may be thought of as a single resource 110 of 1000 MW. Other sizes may be supported. Such a system is illustrated in FIG. 2 as the system 200. For purposes of creating the simulation of the system 200, the simulator 170 may calculate $X_g$ which is Thévenin equivalent impedance of the grid 150.

Figure 3:
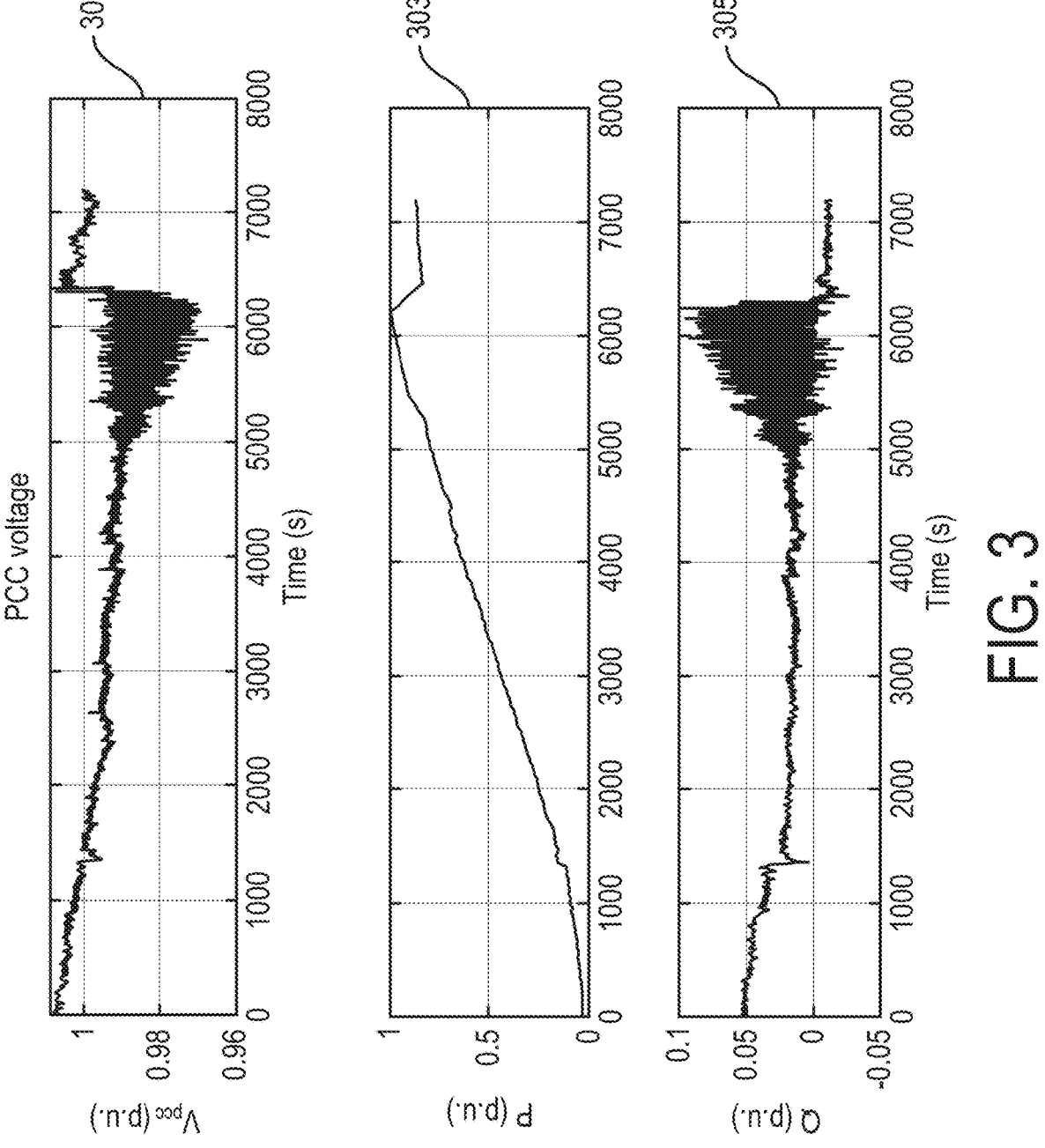
FIG. 3 is an illustration of example graphs 301, 303, and 305 of hypothetical data from the data stream 160.

There are several ways to find $X_g$. First, the simulator 170 may examine data from the data stream 160 where oscillations have not happened. FIG. 3 is an illustration of example data from the data stream 160 (i.e., the graphs 301, 303, and 305). As can be seen in the graphs of FIG. 3, there were no oscillations between 0 and 5000 seconds. During this period, the var is remaining close to 0 MVAr while the real power ramps from 0 to 0.8 p.u. and the voltage is seen to reduce from 1.01 p.u. to 0.99 p.u. The dq-axis currents (where the d-axis is aligned to the POI voltage) can be found as the follows:

$$i_d = \frac{P}{V} \approx P, \ i_q = -\frac{Q}{V} \approx 0, \tag{1}$$

since the reactive power is close to 0 and the POI voltage is close to 1.

In one embodiment, the simulator 170 may determine $X_g$ based on a trend of power and voltage. The simulator 170 may determine an algebraic relationship based on the relationship between the POI voltage phasor $\overline{V}=Ve^{j\delta}$, dq-axis currents, the grid impedance and the infinite bus voltage can be found as follows.

$$Ve^{j\delta} = (i_d + ji_q)e^{j\delta} \times (jX_g) + V_g. \tag{2}$$

Separating the real and imaginary parts leads to the following:

$$V = V_g\cos\delta, \tag{3}$$

$$0 = PX_g - V_g\sin\delta. \tag{4}$$

At t=0, V=1.01 and P=0. According to (4), δ is 0 since P=0. Hence $V_g$=1.01 according to (3). At t=5000 s, V=0.99 and P=0.8. According to (3), $$\cos\delta = \frac{V}{V_g} = \frac{0.99}{1.01}.$$

This leads to sin δ≈0.2. According to (4), $X_g=V_g$ sin δ/P=0.25 p.u.

In another embodiment, the simulator 170 may determine $X_g$ by utilizing the small-signal relationship between the POI voltage and the dq-axis current. Starting from a different version of (2):

$$V = jX_g(i_d + ji_q) + V_g \cdot e^{-j\delta}. \tag{5}$$

Linearizing this equation leads to the linear relationship between the POI bus' voltage and the two currents:

$$\Rightarrow \Delta V = -X_g\Delta i_q + V_g\sin\delta\Delta\delta = -X_g\Delta i_q - \underbrace{X_g\tan\delta\Delta i_d}_{c}. \tag{6}$$

Note that the real power has no oscillations. Hence, by focusing on the oscillations only, ΔP≈0 may be viewed. The linear relationship between the real power, reactive power, vs. the voltage and currents is as follows.

$$P = Vi_d, \ \Rightarrow \Delta P = V\Delta i_d + i_d\Delta V, \tag{7}$$

$$Q = -Vi_q, \ \Rightarrow \Delta Q = -V\Delta i_q + i_q\Delta V \approx -V\Delta i_q. \tag{8}$$

The approximation is based on the fact that the reactive power (current) is close to 0.

Since ΔP≈0, $0=V\Delta i_d+i_d\Delta V$ when P=0.8, V=0.99, sin δ≈0.2. Hence $\Delta i_d$=−0.8ΔV and tan δ≈0.2. The second component in (6) $c\Delta i_d$≈0.2$X_g\Delta i_d$=−0.16$X_g\Delta V$ can be ignored.

Therefore, (6) is reduced to the following equation:

$$\Delta V = -X_g\Delta i_q = X_g\Delta Q \tag{9}$$

With respect to the data from 5000 s-6000 presented in FIG. 3, after the voltage and var data are detrended, it is found that volt and var are proportionally related and ΔV≈0.25ΔQ.

Both methods for calculating $X_g$ described above lead to the finding that the grid impedance is 0.25 p.u. In fact, the three-phase short circuit capacity for the 230 kV bus is 20.458 kA, which implicates 8,150 MW short circuit capacity. For a hypothetical 1000 MW power plant set, the SCR is ~8. Using a Thévenin equivalent source to represent the grid impedance, then $X_g$ should be 0.125. $X_g$ implicated from the data is about two times of the value computed by the short circuit capacity.

This mismatch may be due to the existence of another 1000 MW solar PV power plant 110 closeby. The two plants 110 can be viewed as two parallel plants connected to the infinite bus through 0.125 p.u. grid impedance. For each power plant 110, it can be viewed as a single plant connected to the infinite bus through 0.25 p.u. grid impedance.

After calculating the $X_g$, the simulator 170 may next determine the control mode used by each of the power plants 110. Generally, the power plants 110 may operate using one of voltage-var droop control mode or constant power factor mode. Depending on the embodiment, the simulation 170 may determine the operating mode of a power plant 110 based on information provided by an associated plant operator. Alternatively, the simulator 170 may determine the operating mode based on the data stream 160. For example, if the vars from a power plant 110 and the voltage from the plant 110 follows the relationship $\Delta Q^* = -K_{droop} \Delta V$, then the power plant 110 may be operating using a voltage-var droop control mode.

Figure 4:
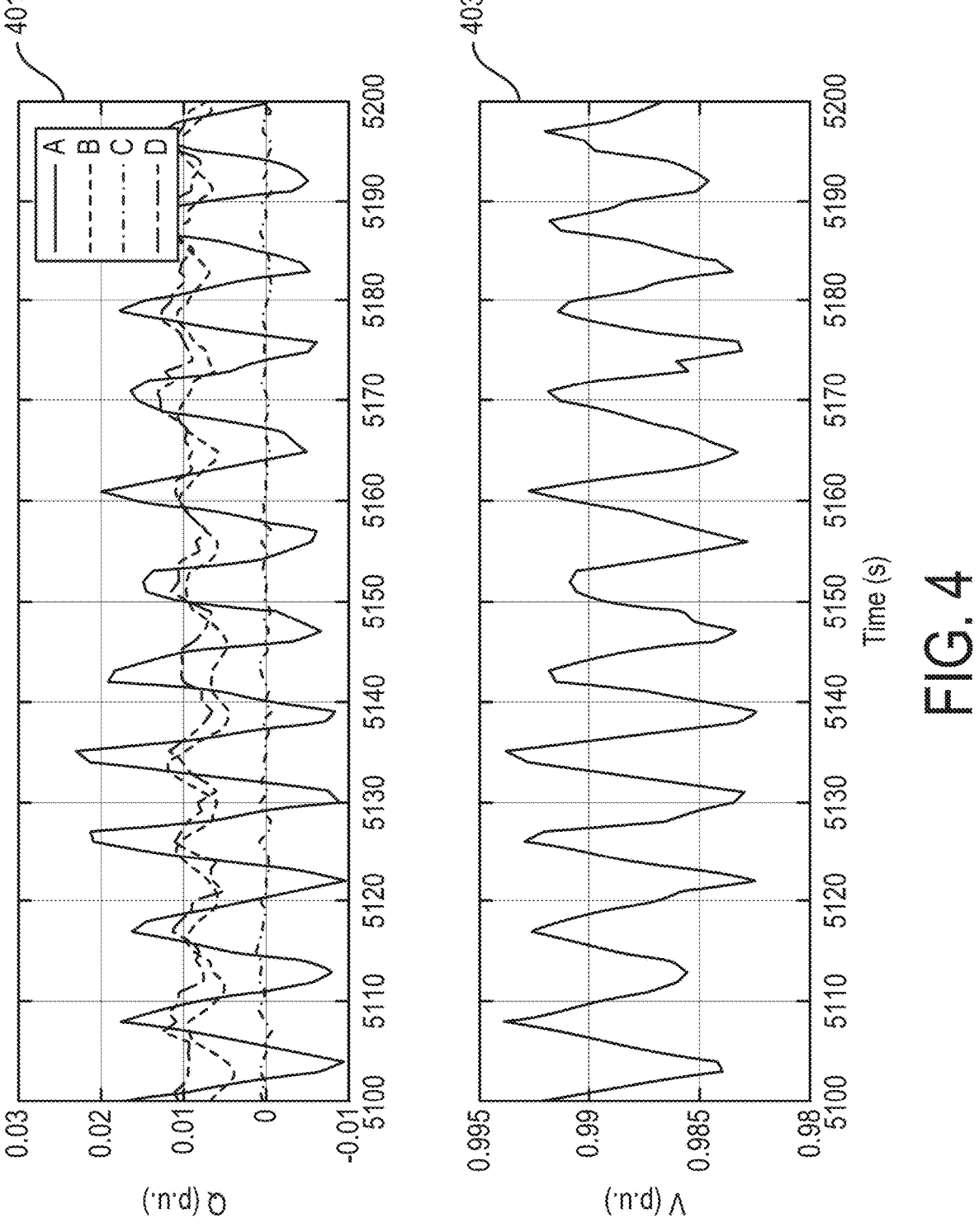
FIG. 4 is an illustration of graphs 401 and 403 showing zoomed in hypothetical data from the data stream 160.

After determining the operating mode, the simulator 170 may next estimate the overall droop gain and the communication delay. FIG. 4 is an illustration of graphs 401 and 403 showing zoomed in hypothetical data from the data stream 160. As can be seen in the graph 401, the line labeled "A" corresponding to the data from the power plant 110A shows that the power plant 110A has the most sever oscillations. The peak to peak magnitude is about 30 MVAr or 0.03 p.u. for Plant A, and 5 MVAr or 0.005 p.u. for the power plant 110B and the power plant 110D. The peak to peak magnitude of the voltage is about 2.5 kV or 0.01 p.u . . . . Thus, we can see that the aggregated droop gain is 3+0.5+0.5=4 p.u. Finally, it can be seen that at 0.1 Hz oscillation, the vars and the voltage are in phase. This means that the delay brings additional 180° phase lag to make $\Delta V$ and $\Delta Q$ in phase.

$$\Delta Q \approx \Delta Q^* e^{-\tau s} = -K_{droop} \cdot \Delta V \cdot e^{-\tau s}. \qquad (10)$$

For the 0.1-Hz oscillations, $s=j2\pi \times 0.1$. If $\tau=5$ s, $e^{-\tau s}$ introduces 180° phase lag. This leads to $\Delta V$ and $\Delta Q$ in phase. Therefore, the delay is approximately 5 s.

Figure 5:
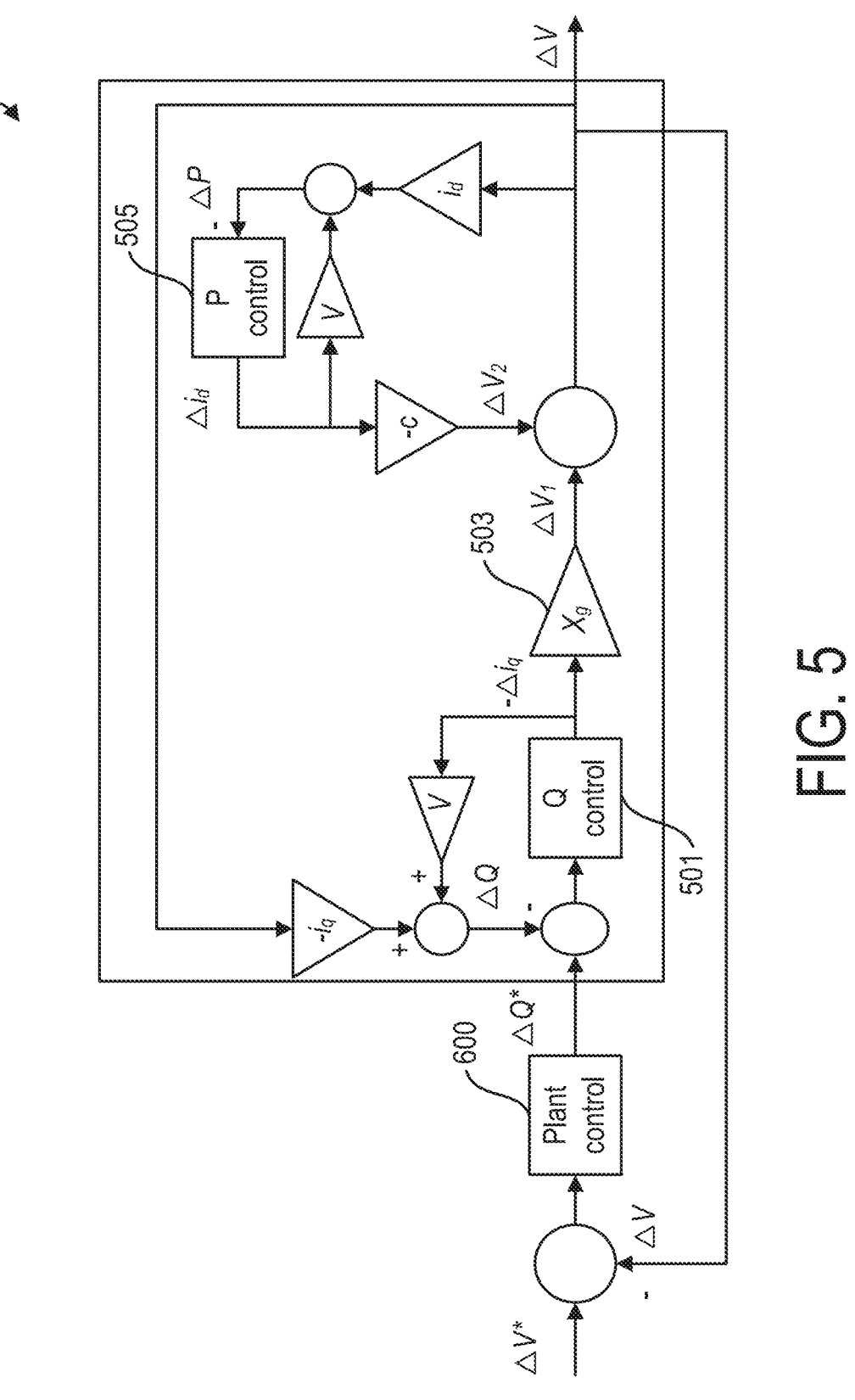
FIG. 5 is an illustration of a feedback system 500 for modeling the power plants 110 and grid 150.

FIG. 5 is an illustration of a feedback system 500 for modeling the power plants 110 and grid 150. The system 500 includes a plant control 600 and the $X_g$, 503. The system 500 further includes inverter-level PQ following control (i.e., the Q-control 501 and the P-control 505), and the effect of $\Delta i_d$ and $\Delta i_g$ on the POI voltage (6). The real and reactive power vs. currents and voltage (7) (8) have also been included in the diagram. A quick analysis on $\Delta V/\Delta V_1$ is given as follows.

$$\frac{\Delta V}{\Delta V_1} = \frac{1}{1 - (-c)i_d \frac{-(K_{pp} + K_{ip}/s)}{1 + K_{pp} + K_{ip}/s}} \approx \frac{1}{1 - ci_d}, \text{ for } s = 0, \qquad (11)$$

where $K_{pp}$ and $K_{ip}$ are related to the power control: $K_{pp} + K_{ip}/s$. It can be seen that a higher power transfer means a larger $i_d$ and c ($c = X_g \tan \delta$). Thus, the gain of $\Delta V/\Delta V_1$ increases. In turn, the voltage to var sensitivity increases.

The effect of the proportional integral (PI) control is equivalent to a high-pass filter so that the gain from the voltage to the real power in the low frequency range is very small. Thus, oscillations are not observable in real power.

The above system can be further simplified by considering that $i_q=0$ so that from the var order to $-i_q$ can be simply represented by the following:

$$\frac{-\Delta i_q}{\Delta Q^*} = \frac{K_{pq} + K_{iq}/s}{1 + V(K_{pq} + K_{iq}/s)} = \frac{0.01s + 1}{0.05s + 1}, \qquad (13)$$

If the PI control parameters for the var control are 0.25 and 25. The entire system's open-loop gain can be found as:

$$LoopGain = \underbrace{\frac{1}{0.1s + 1} K_{droop}^{-4s}}_{Plant-levelcontrol} \underbrace{\frac{-\Delta i_q}{\Delta Q^*}}_{varcontrol} X_g \underbrace{\frac{\Delta V}{\Delta V_1}}_{effectofpower} \qquad (14)$$

The simulator 170 may generate a model of the integrated system including the power plants 110 and grid 150 based on the determined grid impedance $X_g$, aggregated droop gain and aggregated delay. This model is based on the assumption that the solar PV (e.g., the power plants 110A-D) can be treated as controllable current source. The transmission line is treated as an RL circuit, with $X_g/R_g=20$. Real and imaginary power, and voltage are all expressed in nonlinear relationship with the dq-axis currents $i_d$ and $i_g$, shown in the follows.

$$P = Vi_d, Q = -Vi_q \qquad (15)$$

$$V = R_g i_d - X_g i_q + \sqrt{V_g^2 - (R_g i_q + X_g i_d)^2}. \qquad (16)$$

Figure 6:
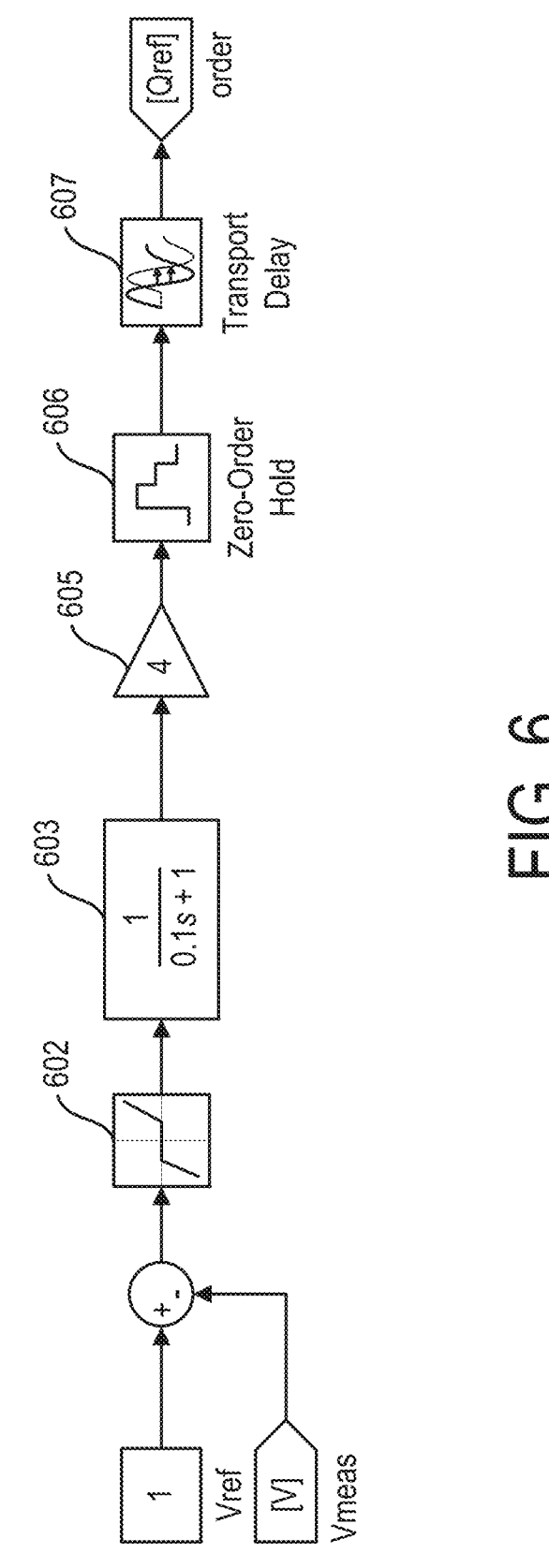
FIG. 6 is an illustration of a an example plant level control 600.

The model used for simulation adopts the same assumptions as that shown in FIG. 5, except that the the power expressions and voltage expressions are nonlinear. The inverter-based resource power plant is assumed as a controllable current source with dq-axis currents injected to the grid. For this research, the d-axis current reference is also generated by the real power PI control. The q-axis current reference is generated by reactive power control. Further, a plant level control 600 generates the reactive power order. The plant level control 600 is illustrated in FIG. 6.

The plant-level control 600 has a low-pass filter $1/(1+0.1s)$ 603 to model the voltage sensor smoothing effect, a dead zone 602 with limits at ±0.005 pu, a droop gain 605 (gain is 4), a sampling effect 606 (modeled by a zero-order hold of 0.2 s), and a communication delay 607 (4 s). These assumptions of the plant level control structure align with the real-world knowledge on solar PV plant-level control. The delay time is based on the analysis of the particular event data.

FIG. 7 is an illustration of an example method 700 for modeling one or more power plants 110 and a grid 150. The method 700 may be implemented by the simulator 170. The simulator 170 may be implemented using one or more general purpose computing devices.

At 705, a data stream is received from one or more power plants. The data stream 160 may be received from each of the one or more power plants 110 may include a variety of data such as real power, reactive power, and voltage magnitudes.

At 710, the grid impedance of the old or more power plants is determined. The grid impedance may be the Thévenin equivalent impedance and may be determined by the simulator 170 using data from the data stream 160. In some embodiments, the simulator 170 may determine the grid impedance based on a trend of real power, reactive power, and voltage in the data stream 160

At 715, power plant control parameters are determined. The power plant control parameters and communication delay may be determined by the simulator 170 using data from the data stream 160. The power control parameters may include droop gain and delay time constant, for example.

At 720, the integrated system is modeled. The integrated system may include the grid 150 and the power plants 110 and may be modeled by the simulator 170. The simulator 170 may then use the model to simulate the operation of the integrated system and to make predictions related to its operation including power output, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a data stream from one or more power plants at the same location by a computing device;
   based on the received data stream, determining a grid impedance of the one or more power plants with respect to a grid by the computing device, wherein determining the grid impedance includes determining the grid impedance based on an algebraic relationship between a point of interconnection voltage phasor, dq-axis currents, the grid impedance, and an infinite bus voltage during a period without oscillations;
   based on the received data stream, determining power plant control parameters and communication delay for each of the one or more power plants; and
   modeling the integrated system consisting of the one or more power plants and the grid based on the determined grid impedance and the power plant control parameters by the computing device.

2. The method of claim 1, wherein the data stream comprises a SCADA/PMU data stream.

3. The method of claim 1, wherein each power plant comprises one or more solar photovoltaic panels or wind turbines.

4. The method of claim 1, wherein the grid impedance is the Thévenin equivalent impedance.

5. The method of claim 1, wherein determining the grid impedance comprises determining the grid impedance based on a trend of real power, reactive power and voltage from the data stream.

6. The method of claim 1, determining the grid impedance comprises determining the impedance based on dynamics from the data stream.

7. The method of claim 1, wherein modeling the grid-integrated power plants based on the determined impedance further comprises:
   for each power plant of the one or more power plants, estimating the voltage control droop gain and communication delay for the power plant;
   modeling the grid based on the determined impedance; and
   modeling the one or more power plants based on the estimated droop gains and communication delays.

8. A system comprising:
   one or more processors; and
   a non-transitory computer-readable medium with computer readable instructions stored thereon that when executed by the one or more processors cause the one or more processors to:
   receive a data stream from one or more power plants at the same location;
   based on the received data stream, determine a grid impedance of the one or more power plants with respect to a grid, wherein determining the grid impedance includes determining the grid impedance based on an algebraic relationship between a point of interconnection voltage phasor, dq-axis currents, the grid impedance, and an infinite bus voltage during a period without oscillations;
   based on the received data stream, determine power plant control parameters and communication delay for each of the one or more power plants; and
   model the integrated system consisting of the one or more power plants and the grid based on the determined grid impedance and the power plant control parameters.

9. The system of claim 8, wherein the data stream comprises a SCADA/PMU data stream.

10. The system of claim 8, wherein each power plant comprises one mor more solar photovoltaic panels or wind turbines.

11. The system of claim 8, wherein the grid impedance is the Thévenin equivalent impedance.

12. The system of claim 8, wherein determining the grid impedance comprises determining the grid impedance based on a trend of real power, reactive power and voltage from the data stream.

13. The system of claim 8, determining the grid impedance comprises determining the impedance based on dynamics from the data stream.

14. The system of claim 8, wherein modeling the grid-integrated power plants based on the determined impedance further comprises:
   for each power plant of the one or more power plants, estimating the voltage control droop gain and communication delay for the power plant;
   modeling the grid based on the determined impedance; and
   modeling the one or more power plants based on the estimated droop gains and communication delays.

15. A non-transitory computer-readable medium with computer readable instructions stored thereon that when executed by tone or more processors cause the one or more processors to:
   receive a data stream from one or more power plants at the same location;
   based on the received data stream, determine a grid impedance of the one or more power plants with respect to a grid, wherein determining the grid impedance includes determining the grid impedance based on an algebraic relationship between a point of interconnection voltage phasor, dq-axis currents, the grid impedance, and an infinite bus voltage during a period without oscillations;
   based on the received data stream, determine power plant control parameters and communication delay for each of the one or more power plants; and
   model the integrated system consisting of the one or more power plants and the grid based on the determined grid impedance and the power plant control parameters.

16. The computer-readable medium of claim 15, wherein the data stream comprises a SCADA/PMU data stream.

17. The computer-readable medium of claim 15, wherein each power plant comprises one mor more solar photovoltaic panels or wind turbines.

18. The computer-readable medium of claim 15, wherein the grid impedance is the Thévenin equivalent impedance.

19. The computer-readable medium of claim 15, wherein determining the grid impedance comprises determining the grid impedance based on a trend of real power, reactive power and voltage from the data stream.

20. The computer-readable medium of claim 15, determining the grid impedance comprises determining the impedance based on dynamics from the data stream.

\* \* \* \* \*